(12) United States Patent
Kamara et al.

(10) Patent No.: US 9,446,687 B2
(45) Date of Patent: Sep. 20, 2016

(54) SELECTABLE FIXED AND ROTATIONAL SEAT FRAME ASSEMBLY FOR A VEHICLE FRAME

(71) Applicant: Ford Global Technologies, LLC, Dearborn, MI (US)

(72) Inventors: Ishmael Kamara, Lanham, MD (US); Peter Kennedy, Bloomfield, MI (US); Michael Kryzaniwskyj, Warren, MI (US); Dan Evans, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/608,572

(22) Filed: Jan. 29, 2015

(65) Prior Publication Data

US 2016/0221471 A1    Aug. 4, 2016

(51) Int. Cl.
| | |
|---|---|
| *B60N 2/02* | (2006.01) |
| *B60N 2/015* | (2006.01) |
| *B60N 2/20* | (2006.01) |
| *B62D 65/14* | (2006.01) |

(52) U.S. Cl.
CPC ............... *B60N 2/015* (2013.01); *B60N 2/20* (2013.01); *B62D 65/14* (2013.01)

(58) Field of Classification Search
CPC ........ B60N 2/06; B60N 2/0705; B60N 2/12; B60N 2/682; B60N 2/2356; B60N 2/0232; B60N 2/4228; B60N 2/68
USPC ..................... 296/65.16, 65.13, 65.09, 65.14
See application file for complete search history.

(56) References Cited

U.S. PATENT DOCUMENTS

| | | | | |
|---|---|---|---|---|
| 4,218,074 A | * | 8/1980 | Crawford ................ | B60R 22/26 280/801.1 |
| 4,368,557 A | * | 1/1983 | Inasawa ................. | B60N 2/015 16/263 |
| 4,606,577 A | * | 8/1986 | Hirama .................... | B60N 2/10 297/331 |
| 4,637,650 A | * | 1/1987 | Inoue ....................... | B60N 2/58 297/378.13 |
| 4,639,040 A | * | 1/1987 | Fujita ..................... | B60N 2/366 296/68.1 |
| 4,988,134 A | * | 1/1991 | Vidwans ................ | B60N 2/433 292/198 |

FOREIGN PATENT DOCUMENTS

| | | |
|---|---|---|
| CN | 102673428 | 9/2012 |
| CN | 203126568 | 8/2013 |

(Continued)

*Primary Examiner* — Kiran B Patel
(74) *Attorney, Agent, or Firm* — Vichit Chea; Price Heneveld LLP (57) ABSTRACT

A seat attachment system for a vehicle frame includes a vehicle frame having a lower seat-bracket receptacle defined within a frame base and an upper seat-bracket receptacle defined within an upper frame member, a seat frame attached to the vehicle frame at the lower and upper seat-bracket receptacles and a lower seat-bracket set comprising a rotation-free lower bracket and a rotational lower bracket, wherein the lower seat bracket receptacle receives one of the rotation-free lower bracket and the rotational lower bracket, wherein when the rotation-free lower bracket is attached to the lower seat-bracket receptacle and the seat frame is coupled with the rotation-free lower bracket, the seat frame is free of rotational movement, and wherein when the rotational lower bracket is attached to the lower seat-bracket receptacle and the seat frame is coupled with the rotational lower bracket, the seat frame is capable of rotational movement.

6 Claims, 10 Drawing Sheets

(56) References Cited

U.S. PATENT DOCUMENTS

| | | | | |
|---|---|---|---|---|
| 5,398,995 A * | 3/1995 | Hurite | B60N 2/366 | 297/378.1 |
| 5,582,453 A * | 12/1996 | Leuchtmann | B60N 2/366 | 296/65.09 |
| 5,662,367 A * | 9/1997 | Rastetter | B60N 2/3097 | 248/419 |
| 5,685,612 A | 11/1997 | MacDonald et al. | | |
| 5,700,056 A * | 12/1997 | Bernard | B60N 2/366 | 292/DIG. 27 |
| 5,700,058 A * | 12/1997 | Balagurumurthy | B60N 2/20 | 296/63 |
| 5,716,100 A * | 2/1998 | Lang | B60N 2/242 | 297/378.1 |
| 5,752,739 A * | 5/1998 | Saeki | B60N 2/4613 | 297/113 |
| 5,833,203 A | 11/1998 | Denis et al. | | |
| 5,890,831 A * | 4/1999 | Kato | B60N 2/015 | 248/503.1 |
| 5,918,934 A * | 7/1999 | Siegrist | B60N 2/2821 | 296/64 |
| 6,030,046 A * | 2/2000 | Dorow | B60N 2/2821 | 297/216.11 |
| 6,039,401 A * | 3/2000 | Rus | B60N 2/01583 | 296/65.03 |
| 6,113,180 A * | 9/2000 | Corporon | B60G 15/063 | 296/198 |
| 6,354,648 B1 * | 3/2002 | Allan | B60N 2/2806 | 296/63 |
| 6,511,130 B2 * | 1/2003 | Dinkel | B60N 2/4808 | 297/408 |
| 6,742,847 B2 * | 6/2004 | Yanai | B60N 2/3013 | 297/216.13 |
| 7,073,839 B2 * | 7/2006 | Boyina | B60N 2/01583 | 296/65.03 |
| 7,131,693 B2 * | 11/2006 | Smallwood | B60N 2/289 | 224/275 |
| 7,410,217 B2 * | 8/2008 | Inoue | B60N 2/366 | 297/378.13 |
| 7,581,793 B2 * | 9/2009 | Hartmann | B60N 2/3013 | 296/65.03 |
| 7,699,396 B2 * | 4/2010 | Ghisoni | B60N 2/58 | 297/188.2 |
| 7,938,485 B1 * | 5/2011 | Perciballi | B60N 2/24 | 297/216.1 |
| 8,118,342 B2 * | 2/2012 | Kokubo | B60N 2/2245 | 296/65.16 |
| 8,172,298 B2 * | 5/2012 | Jeong | B60N 2/68 | 296/37.1 |
| 8,182,015 B2 * | 5/2012 | Muck | B60N 2/01516 | 248/503.1 |
| 8,205,945 B2 * | 6/2012 | Ma | B60N 2/14 | 248/349.1 |
| 8,215,695 B2 * | 7/2012 | Ida | B60N 2/01583 | 296/65.03 |
| 8,267,458 B2 * | 9/2012 | Lindsay | B60N 2/366 | 296/65.16 |
| 8,308,238 B2 * | 11/2012 | Imaoka | B60N 2/688 | 297/105 |
| 8,353,552 B2 * | 1/2013 | Scheurer, II | B60N 2/3011 | 296/65.09 |
| 8,540,318 B2 * | 9/2013 | Folkert | B60N 2/686 | 297/452.14 |
| 8,720,847 B2 * | 5/2014 | Reimann | B60N 2/36 | 248/503.1 |
| 8,801,101 B2 * | 8/2014 | Dagcioglu | B60N 2/3011 | 296/65.09 |
| 8,820,814 B2 * | 9/2014 | Asai | B60N 2/015 | 296/63 |
| 8,864,224 B2 * | 10/2014 | Kobayashi | B60N 2/3011 | 297/113 |
| 8,905,475 B2 * | 12/2014 | Schenten | B60N 2/2245 | 297/232 |
| 8,919,626 B1 * | 12/2014 | Smith | A61G 3/0209 | 224/519 |
| 8,939,511 B2 * | 1/2015 | Majima | B60N 2/36 | 296/65.16 |
| 8,985,692 B2 * | 3/2015 | Pacolt | B60N 2/20 | 296/65.05 |
| 9,022,340 B2 * | 5/2015 | McLeod | B60N 2/2887 | 248/500 |
| 9,050,911 B2 * | 6/2015 | Wieclawski | B60N 2/2245 | |
| 9,061,609 B2 * | 6/2015 | Hou | B60N 2/2827 | |
| 9,132,748 B2 * | 9/2015 | Park | B60N 2/015 | |
| 9,150,120 B2 * | 10/2015 | Antoine | B60N 2/6027 | |

FOREIGN PATENT DOCUMENTS

| | | |
|---|---|---|
| DE | 102005062056 | 6/2007 |
| DE | 102008064461 | 6/2010 |

\* cited by examiner

SELECTABLE FIXED AND ROTATIONAL SEAT FRAME ASSEMBLY FOR A VEHICLE FRAME

FIELD OF THE INVENTION

The present invention generally relates to vehicle frames having receptacles for receiving a frame for the rear seat within a vehicle cabin. More specifically, the present invention generally relates to a vehicle frame assembly having receptacles that can selectively receive brackets for a rotational or rotation-free rear seat for the vehicle.

BACKGROUND OF THE INVENTION

Various automobiles can include back seats that, when installed, are in a fixed position relative to the vehicle frame and are not capable of rotation. Certain vehicles, possibly of the same make and model, can include features that allow the rear seat to be rotated, where such a design feature is desired.

SUMMARY OF THE INVENTION

According to one aspect of the present invention, a seat attachment system for a vehicle frame includes a vehicle frame having a lower seat-bracket receptacle defined within a frame base and an upper seat-bracket receptacle defined within an upper frame member. A seat frame is attached to the vehicle frame at the lower and upper seat-bracket receptacles. A lower seat-bracket set includes a rotation-free lower bracket and a rotational lower bracket. The lower seat bracket receptacle receives one of the rotation-free lower bracket and the rotational lower bracket. When the rotation-free lower bracket is attached to the lower seat-bracket receptacle and the seat frame is coupled with the rotation-free lower bracket, the seat frame is free of rotational movement. When the rotational lower bracket is attached to the lower seat-bracket receptacle and the seat frame is coupled with the rotational lower bracket, the seat frame is capable of rotational movement.

According to another aspect of the present invention, a vehicular fixed-seat attachment system includes a frame base having a seat-bracket receptacle. A rotation-free bracket and a rotational bracket are alternatively received by the seat-bracket receptacle. A seat frame is fixedly affixed to the frame base when the rotation-free bracket is disposed in the seat-bracket receptacle and the seat frame is attached to the rotation-free bracket and an upper bracket of the seat frame is coupled to a member of a vehicle frame.

According to another aspect of the present invention, a method for installing a fixed rear seat on a vehicle frame includes providing a vehicle frame having a lower seat frame bracket receptacle and an upper seat frame bracket receptacle. A seat frame is provided and is configured to engage the lower seat frame bracket receptacle and the upper seat frame bracket receptacle. A rotation-free seat bracket set is provided that includes a lower rotation-free bracket and an upper rotation-free bracket. A rotational seat bracket set is provided that includes a lower rotational bracket and an upper rotational bracket. Only one of the rotation-free seat bracket set and the rotational seat bracket set are selected for engagement with the lower and upper seat frame bracket receptacles to determine a selected seat bracket set. The selected seat bracket set is connected to the lower and upper seat frame bracket receptacles. The seat frame is connected to the lower seat frame bracket receptacle and the upper seat frame bracket receptacle via the selected seat bracket set. When the selected seat bracket set is the rotation-free seat bracket set, the seat frame is fixedly connected to the lower rotation-free bracket such that the seat frame is not capable of rotational movement relative to the vehicle frame. When the selected seat bracket set is the rotational seat bracket set, the seat frame is rotationally connected to the lower rotational bracket such that the seat frame is selectively rotatable relative to the vehicle frame.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
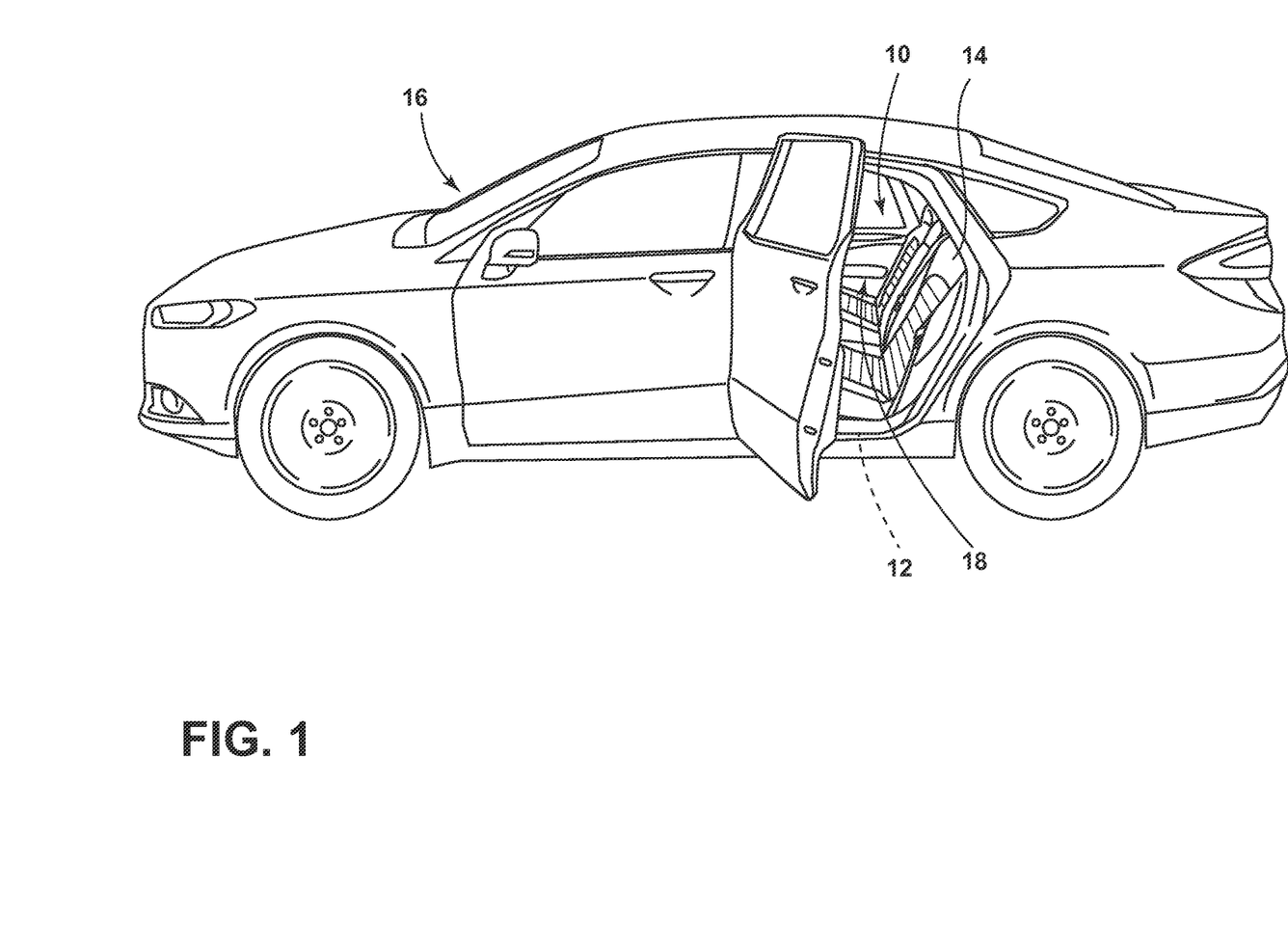
FIG. 1 is a side perspective view of a vehicle with the rear door in an open position and the rear seat of the vehicle visible from the exterior.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, reference numeral 10 generally refers to a seat attachment system for a vehicle frame for installing a rear seat 14 of a vehicle 16 within the passenger cabin 18 of the vehicle 16. The seat attachment system 10 for the vehicle 16 can include a vehicle frame 12 having a lower seat-bracket receptacle 20 defined within a frame base 22 and an upper seat-bracket receptacle 24 defined within an upper frame member 26. A seat frame 28 is attached to the vehicle frame 12 at the lower and upper seat-bracket receptacles 20, 24. A lower seat-bracket set includes a lower rotation-free bracket 30 and a lower rotational bracket 32 (shown in FIG. 10), wherein the lower seat-bracket receptacle 20 receives one of the lower rotation-free bracket 30 and the lower rotational bracket 32. When the lower rotation-free bracket 30 is attached to the lower seat-bracket receptacle 20 and the seat frame 28 is coupled to the lower rotation-free bracket 30, the seat frame 28 is free of rotational movement relative to the vehicle frame 12. When the lower rotational bracket 32 is attached to the lower seat-bracket receptacle 20 and the seat frame 28 is coupled with the lower rotational bracket 32, the seat frame 28 is capable of at least selective rotational movement relative to the vehicle frame 12.

Figure 2:
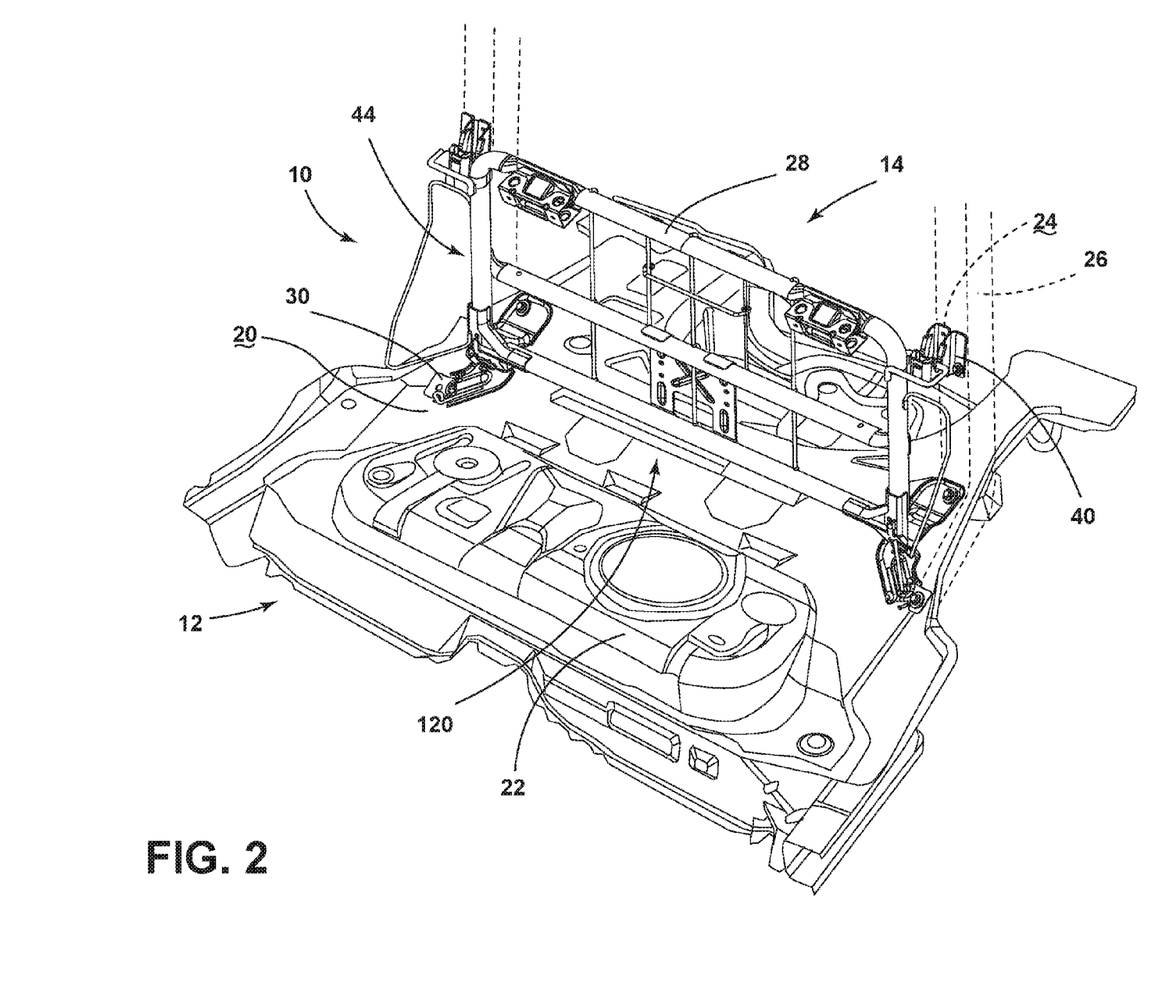
FIG. 2 is a top perspective view of a portion of a vehicle frame with an embodiment of a seat attachment system incorporating a non-rotational bracket system partially exploded therefrom.
Figure 3:
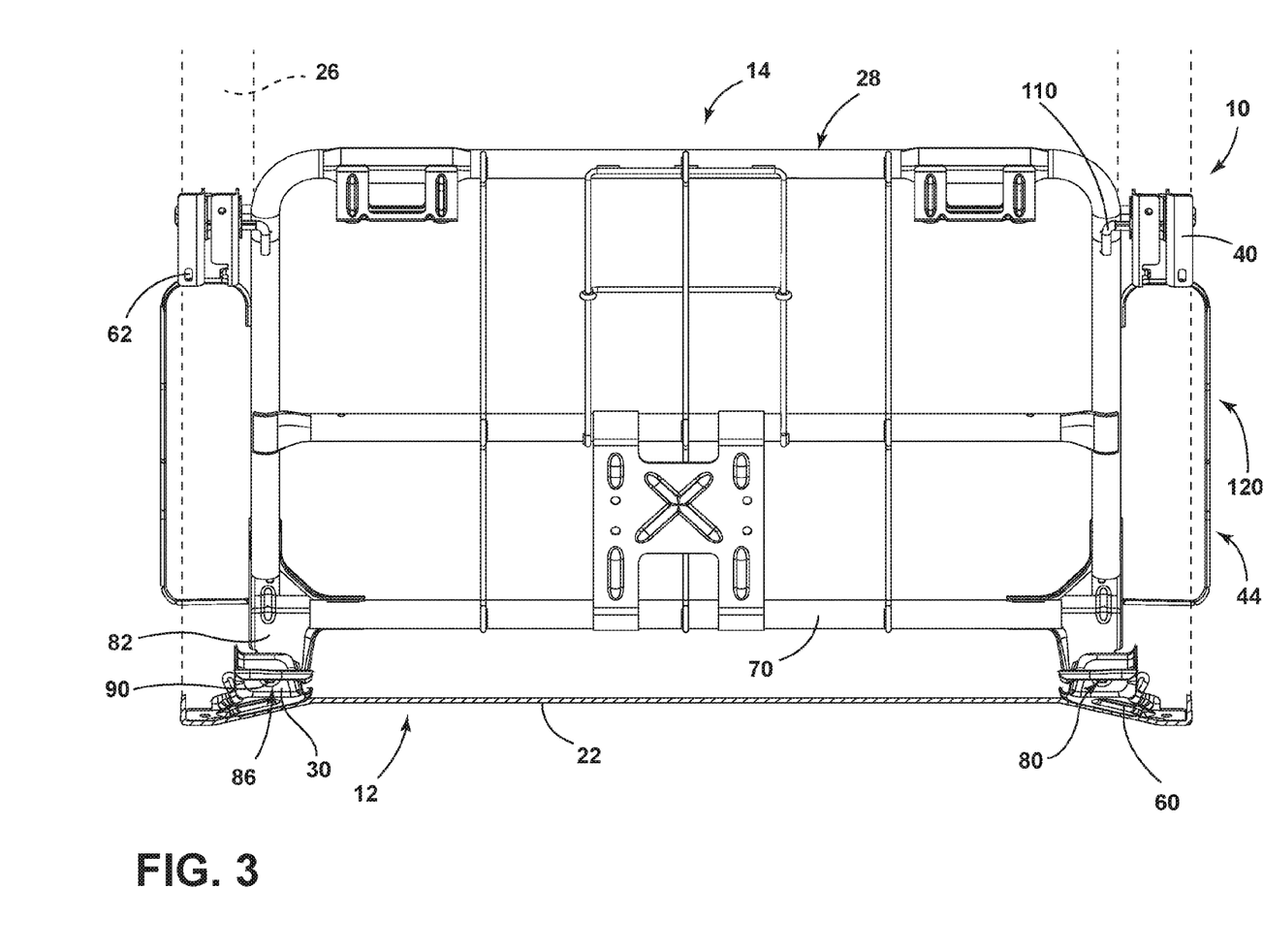
FIG. 3 is a rear elevational view of the seat attachment system of FIG. 2 disposed upon a portion of a vehicle frame.
Figure 4:
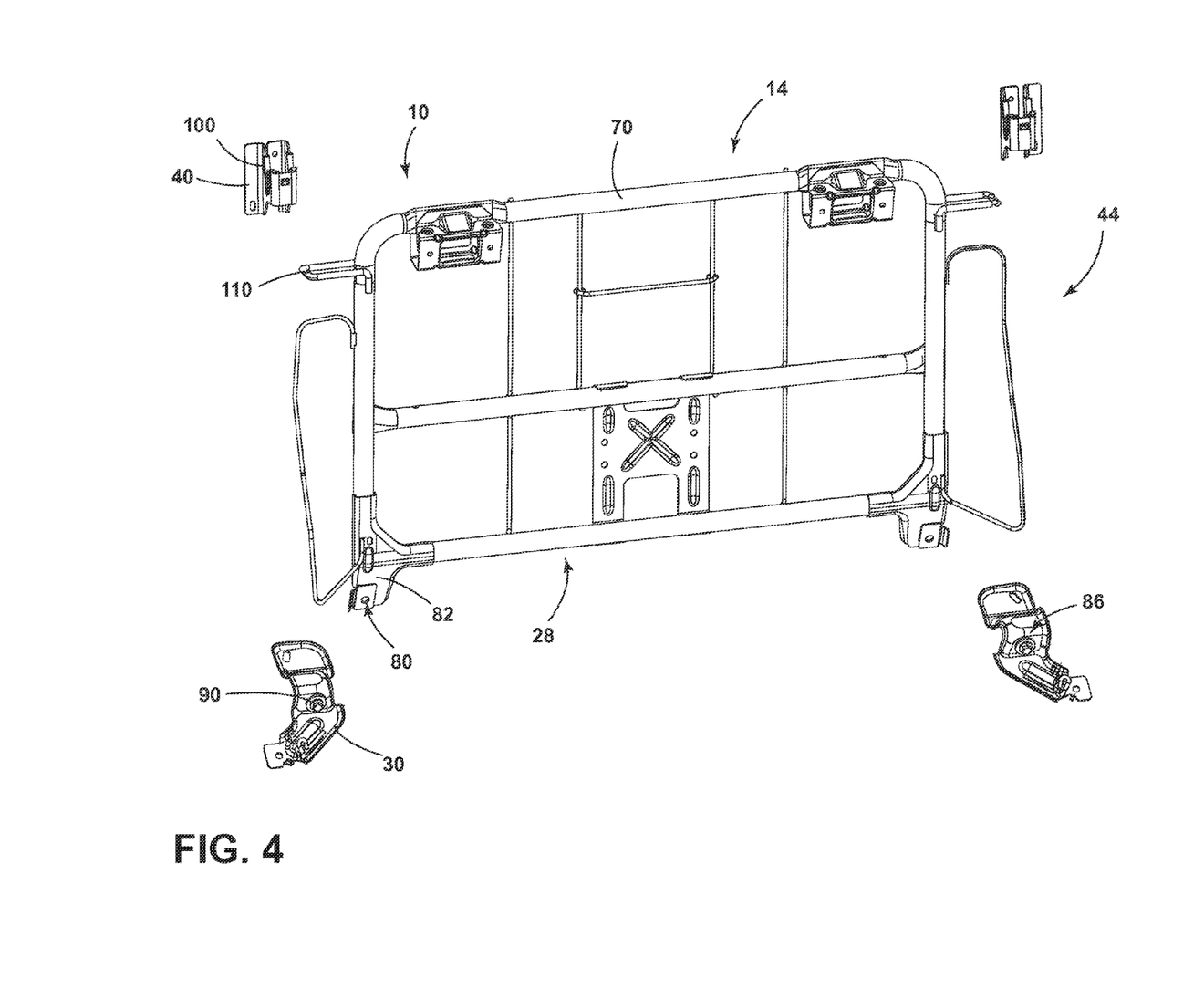
FIG. 4 is a front exploded elevational view of the non-rotational seat frame assembly of FIG. 3.
Figure 5:
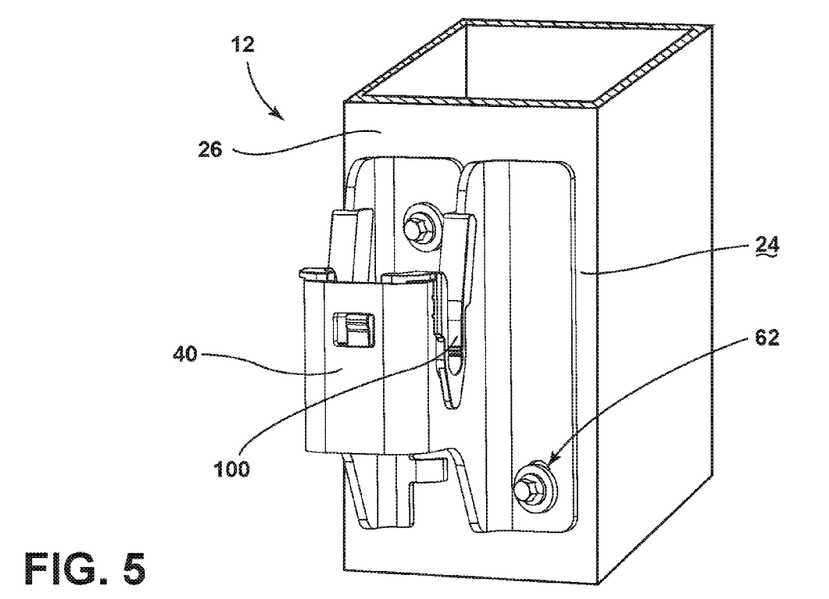
FIG. 5 is a front perspective view of the upper non-rotational bracket of the seat attachment system of FIG. 3.
Figure 6:
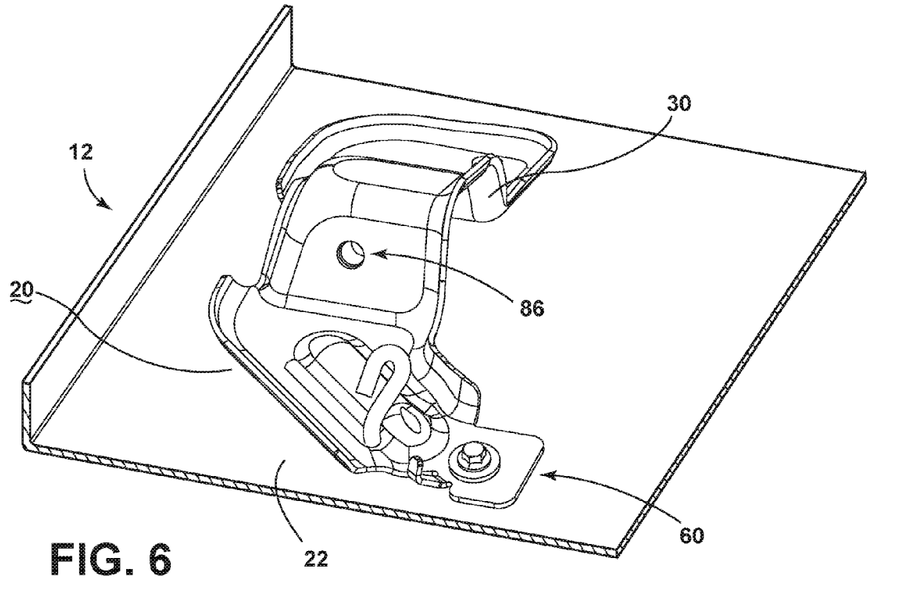
FIG. 6 is a top perspective view of the lower non-rotational bracket of the seat attachment system of FIG. 3.
Figure 7:
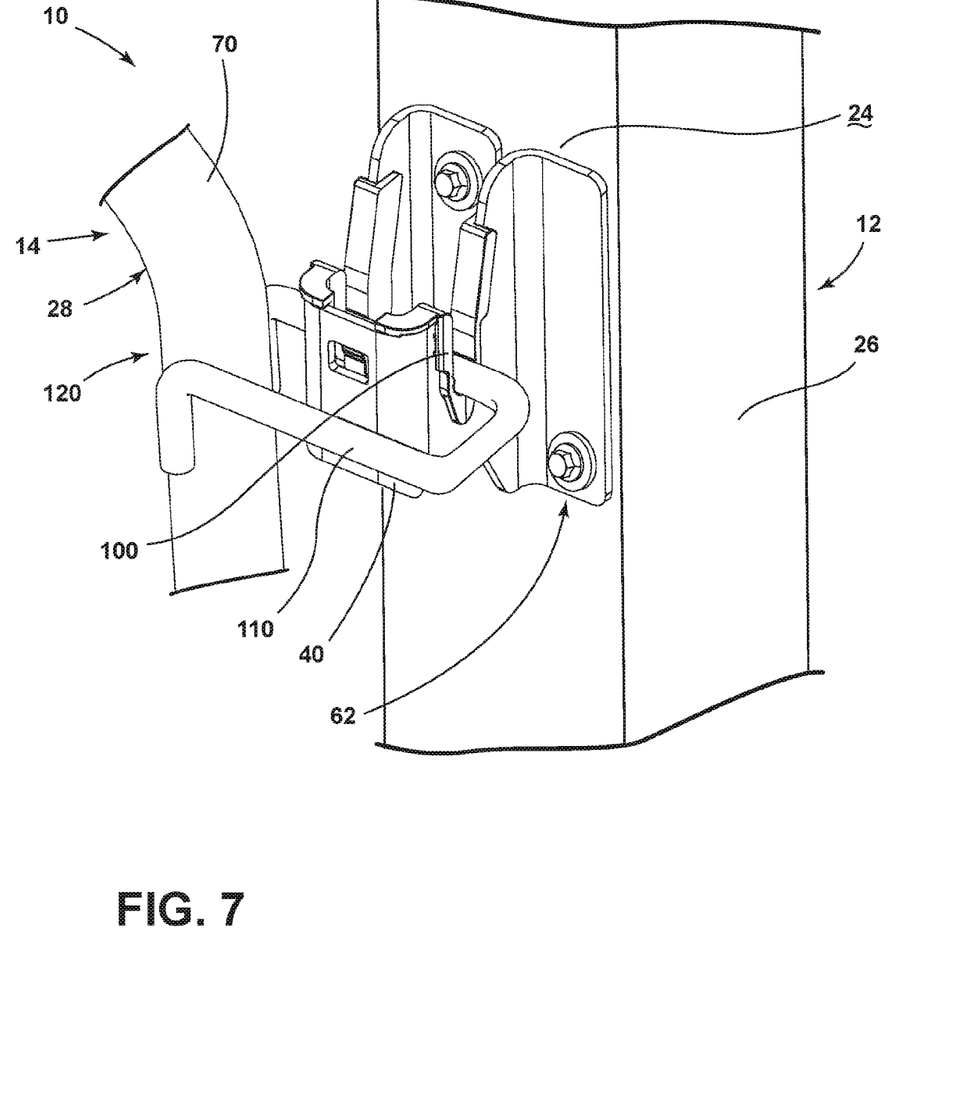
FIG. 7 is a perspective view of the engagement between the seat frame and the upper non-rotational bracket of FIG. 3.
Figure 8:
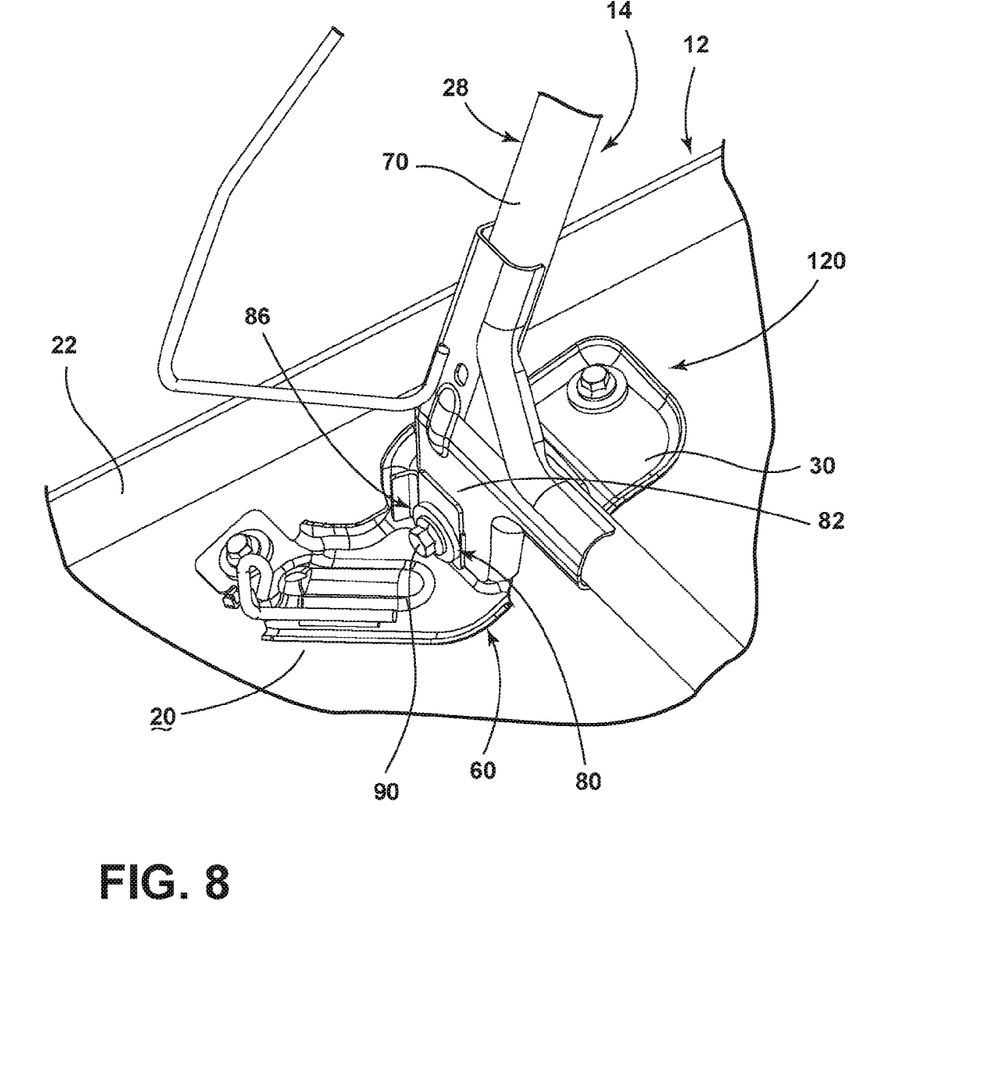
FIG. 8 is a top perspective view of the connection between a seat frame and the lower non-rotational seat bracket of FIG. 3.
Figure 9:
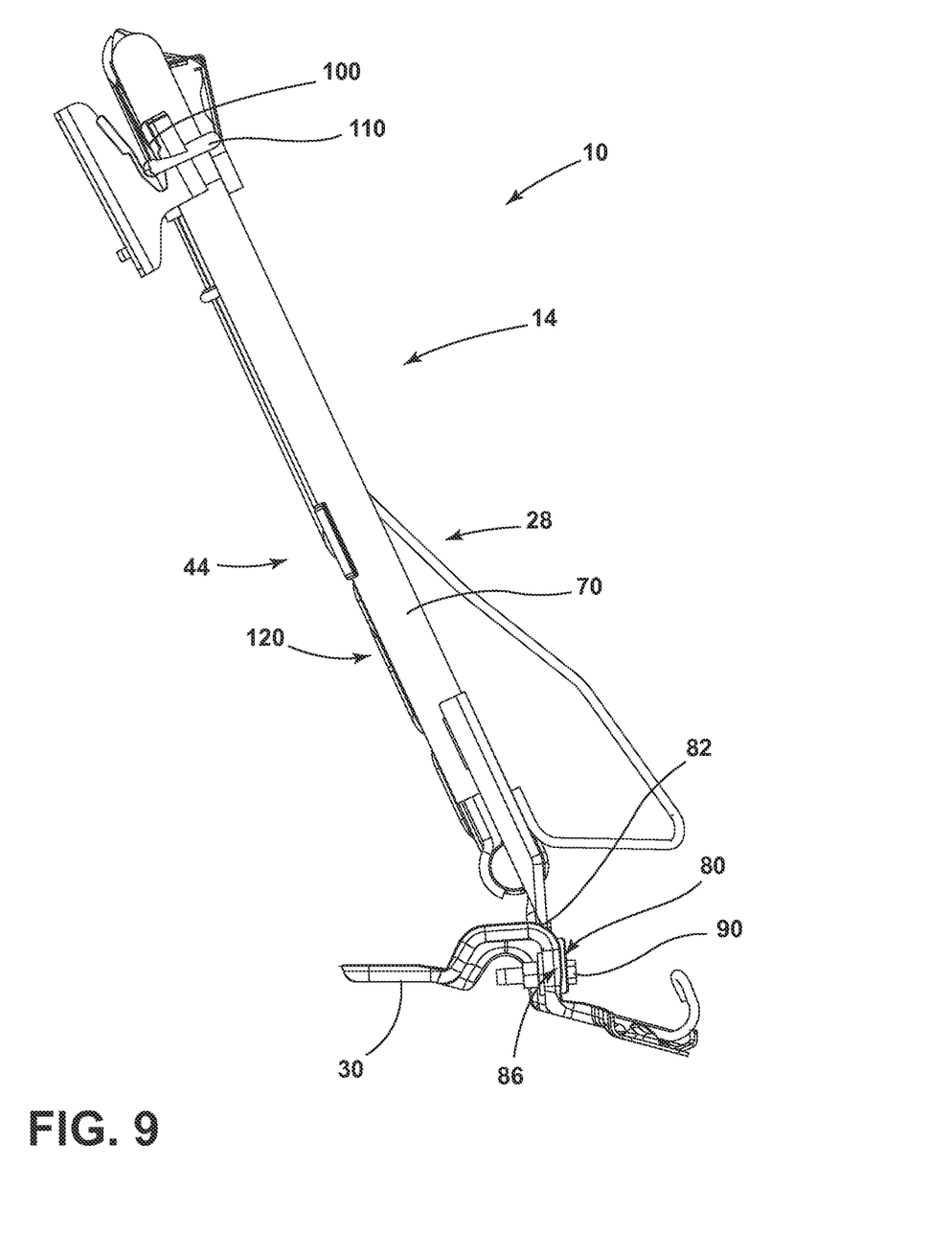
FIG. 9 is a side perspective view of the non-rotational seat frame assembly of FIG. 3.

Referring now to FIGS. 2-4, it is contemplated that the seat attachment system 10 can also include an upper seat bracket or upper seat bracket set that includes an upper rotation-free bracket 40 and an upper rotational bracket 42. In such an embodiment, the upper rotation-free bracket 40 corresponds with the lower rotation-free bracket 30, which defines a rotation-free seat frame assembly 44, to position the seat frame 28 in a fixed and non-rotational position 120 relative to the vehicle frame 12. Conversely, the upper rotational bracket 42 corresponds to the lower rotational bracket 32, which defines a rotational seat frame assembly 46, to couple the seat frame 28 to the vehicle frame 12 at the upper and lower seat-bracket receptacles 24, 20 to rotationally fix the seat frame 28 to the vehicle frame 12, such that the seat frame 28 is capable of selective rotation relative to the vehicle frame 12.

Referring again to FIGS. 2-4, according to the various embodiments, the vehicle frame 12 can include the frame base 22 and an upper frame member 26 that are configured to receive either the rotational seat frame assembly 46 or the rotation-free seat frame assembly 44. In this manner, the rotational and rotation-free seat frame assemblies 46, 44 are alternatively and exclusively attached to the upper and lower seat-bracket receptacles 24, 20 for installation of only one of the rotational and rotation-free seat frame assemblies 46, 44. To accommodate this alternative and exclusive installation configuration of the rotational and rotation-free seat frame assemblies 46, 44, the vehicle frame 12 includes a single lower connection area 60 within each lower seat-bracket receptacle 20 and a single upper connection area 62 within each upper seat-bracket receptacle 24. In this manner, during manufacture of the vehicle 16, when the seat frame 28 of the rear seat 14 is to be installed within the vehicle 16 and upon the vehicle frame 12, one of the rotational and rotation-free seat frame assemblies 46, 44 can be selected for installation upon the upper and lower connection areas 62, 60 of the vehicle frame 12. Because the upper and lower seat-bracket receptacles 24, 20 can receive either the rotational or rotation-free seat frame assemblies 46, 44, specifically configured vehicle frames 12 not necessary as either the rotational or rotation-free seat frame assemblies 46, 44 can be installed upon the vehicle frame 12 designed for a particular vehicle 16. In this manner, customization of a particular vehicle trim, make and model can be accomplished during assembly without requiring specifically manufactured vehicle frames 12 for receiving either the rotational or rotation-free seat frame assemblies 46, 44.

Referring again to the embodiment illustrated in FIGS. 2-4 and 9, it is contemplated that the configuration of the upper and lower seat-bracket receptacles 24, 20 can be made to receive the upper and lower rotation-free brackets 40, 30 and the upper and lower rotational brackets 42, 32 in substantially the same configuration. In this manner, separate machinery may not be necessary to attach either of the brackets for the rotational and rotation-free seat frame assemblies 46, 44. In such an embodiment, the upper and lower seat-bracket receptacles 24, 20 can include weld points, rivet areas, bolting areas, or other similar attachment regions disposed within each of the upper and lower seat-bracket receptacles 24, 20 such that the upper and lower rotation-free brackets 40, 30 are attached to the vehicle frame 12 in substantially the same manner as the upper and lower rotational brackets 42, 32. The ability of the upper and lower seat-bracket receptacles 24, 20 to receive either the rotational or rotation-free seat frame assemblies 46, 44 can reduce the number of operations necessary to manufacture cars and also allow for vehicles 16 having different configurations for rear seat 14 (rotational or rotation-free) to be made within a single assembly line without substantial interruption during the manufacture of the various vehicles.

Referring again to FIGS. 1-4 and 10, it is contemplated that in addition to a rotational bracket set that includes the upper and lower rotational brackets 42, 32 and the rotation-free bracket set that includes the upper and lower rotation-free brackets 40, 30, the seat attachment system 10 can also include a seat frame set made up of separate seat frames 28 that can include a rotation-free seat frame 70 and a rotational seat frame 72. In this manner, the rotational seat frame 72 can be part of the rotation-free seat frame assembly 44 and corresponds to the rotation-free seat bracket set. Similarly, the rotational seat frame 72 can be part of the rotational seat frame assembly 46 and corresponds to the rotational seat bracket set.

Referring now to FIGS. 4-10, it is contemplated that the rotation-free seat frame 70 can include substantially fixed connection points 80 at a lower portion 82 of the rotation-free seat frame 70. Accordingly, it is contemplated that the lower portions 82 of the rotation-free seat frame 70 can be permanently fixed to bracket attachment portions 86 of the lower rotation-free brackets 30 to permanently affix the rotation-free seat frame 70 to the lower seat-bracket receptacle 20 such that the rotation-free seat frame 70 is not capable of rotation once it is installed upon the vehicle frame 12. It is contemplated that the connection method for attaching the rotation-free seat frame 70 to the lower seat-bracket receptacle 20 can be a bolted connection, weld, rivet, combinations thereof, or other similar fixed attachment method. The connection between the rotation-free seat frame 70 and the vehicle frame 12 can be a bolt 90 that directly attaches the rotation-free seat frame 70 to the lower rotation-free brackets 30. In such an embodiment, it is contemplated that the lower rotation-free brackets 30 can be pre-installed upon the vehicle frame 12 and positioned to receive, subsequently, the rotation-free seat frame 70. It is also contemplated that the lower rotation-free brackets 30 can be coupled to the rotation-free seat frame 70 before being installed upon the vehicle frame 12. In such an embodiment, it is contemplated that the rotation-free seat frame assembly 44 is at least partially assembled, and then installed, such that the lower rotation-free brackets 30 can be installed within the lower seat-bracket receptacles 20, along with the rotation-free seat frame 70, through bolting, welding, rivets, or other similar connection method.

Referring now to the embodiments illustrated in FIGS. 5-9, it is contemplated that the rotation-free seat frame assembly 44 can include the upper rotation-free bracket 40 that includes a vertically-oriented slot 100. The upper rotation-free bracket 40 can also include a receiving member, within the vertically-oriented slot 100 that fixedly receives a portion of the seat frame 28. It is also contemplated that the upper rotation-free bracket 40 can include various other reception geometries, that can include, but are not limited to, latches, clasps, hasps, bolting areas, weld areas, and other similar attachment mechanisms. In various embodiments where the upper rotation-free bracket 40 includes the vertically-oriented slot 100, it is contemplated that a portion of the rotation-free seat frame 70 can include an engagement protrusion 110 that engages the vertically-oriented slot 100. It is contemplated that the vertically-oriented slot 100 can include a mechanism that fixedly attaches to the engagement protrusion 110 of the rotation-free seat frame 70. It is also contemplated that the vertically-oriented slot 100 can include a single-use mechanism that is configured to receive the engagement protrusion 110 during manufacture of the vehicle 16. Such a mechanism would not include a release such that once the engagement protrusion 110 engages the vertically-oriented slot 100, the engagement protrusion 110 would not be able to be released from the vertically-oriented slot 100 absent dismantling, disassembly, or other destructive separation of the components of the vehicle 16. In various alternate embodiments, the vertically-oriented slot 100 can serve as a positioning mechanism, wherein the engagement protrusion 110 is held within the vertically-oriented slot 100, but not necessarily securely affixed therein. In such an embodiment, the engagement of the engagement protrusion 110 and the vertically-oriented slot 100 positions the lower portion 82 of the rotation-free seat frame 70 to be bolted to the lower rotation-free bracket 30.

Referring again to the embodiment illustrated in FIGS. 5-9, it is contemplated that the upper rotation-free bracket 40 and the lower rotation-free bracket 30 can be installed upon the vehicle frame 12 before the rotation-free seat frame 70 is installed upon the rotation-free seat bracket set. Once the upper and lower rotation-free brackets 40, 30 are installed upon the vehicle frame 12, the rotation-free seat frame 70 is moved into position above the upper and lower rotation-free brackets 40, 30. The engagement protrusion 110 of the rotation-free seat frame 70 is installed within the vertically-oriented slot 100 and moved downward such that the engagement protrusion 110 of the rotation-free seat frame 70 slides into the vertically-oriented slot 100. In this manner, the upper rotation-free bracket 40 engages and, in a loose manner, retains the engagement protrusion 110 of the rotation-free seat frame 70 in a non-rotational position 120 relative to the remainder of the vehicle frame 12. With the engagement protrusion 110 of the rotation-free seat frame 70 slidably disposed within the vertically-oriented slot 100, the connection point 80 at the lower portion 82 of the rotation-free seat frame 70 is substantially positioned proximate the bracket attachment portion 86 of the lower rotation-free bracket 30 such that the connection point 80 of the rotation-free seat frame 70 can be bolted, welded, riveted or otherwise affixed in a non-rotational manner to the lower rotation-free seat bracket. In this manner, the connection between the lower portion 82 of the rotation-free seat frame 70 and the bracket attachment portion 86 of the lower rotation-free bracket 30 is substantially the only area of the seat frame 28 that is fixedly connected to the upper and lower rotation-free brackets 40, 30.

Figure 10:
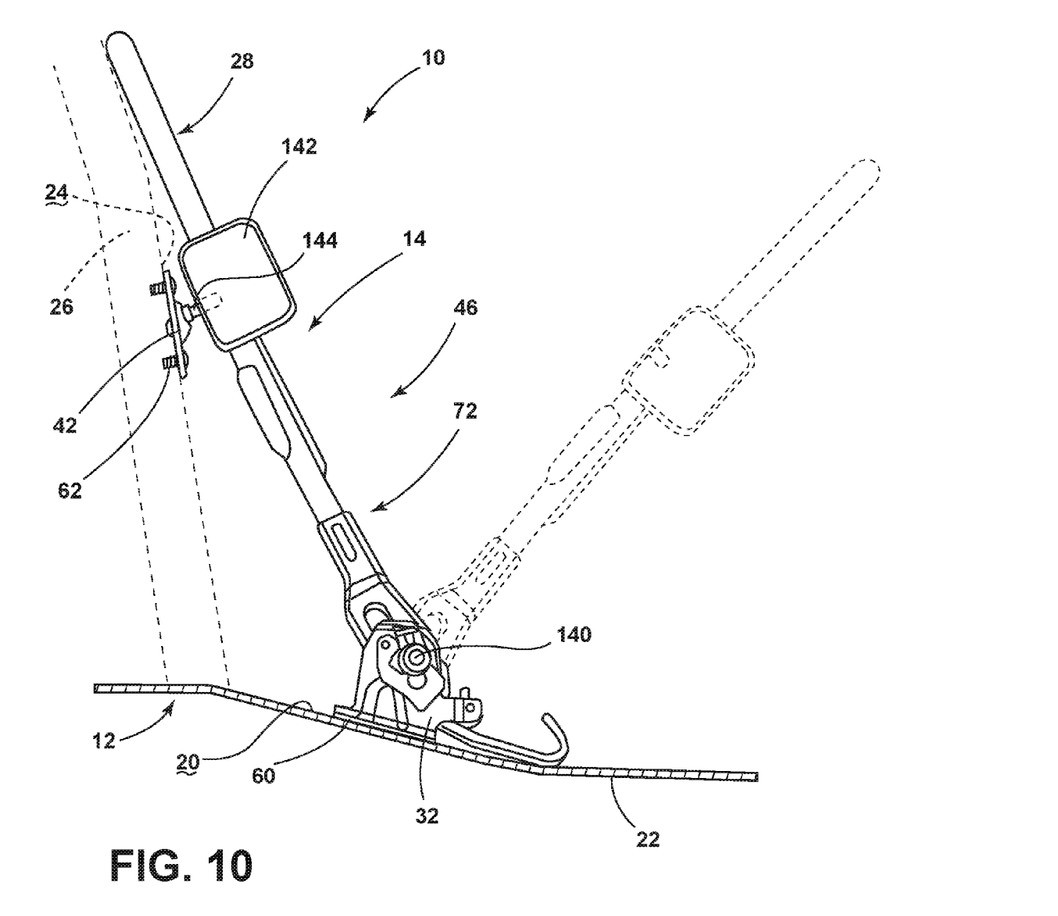
FIG. 10 is a side elevational view of an aspect of the seat attachment system of FIG. 2 incorporating a rotational seat assembly disposed upon a vehicle frame that is also capable of receiving the non-rotational seat frame assembly.
Figure 11:
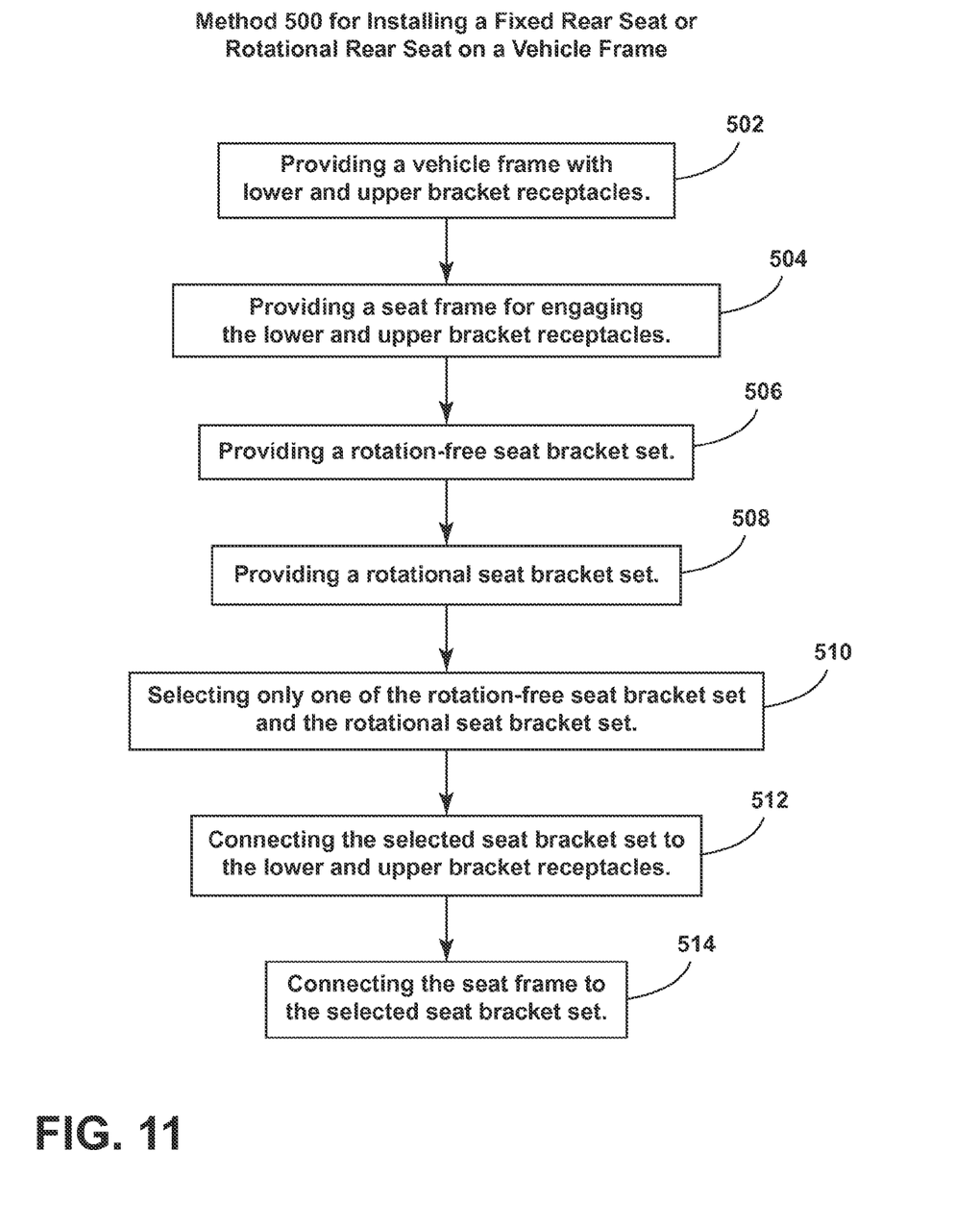
FIG. 11 is a schematic flow diagram illustrating a method for installing a fixed rear seat or a rotational rear seat onto a vehicle frame, according to one embodiment.

Referring now to the embodiment illustrated in FIG. 10, the rotational seat frame assembly 46 can include a rotational seat frame 72 that includes a pivot point 140 positioned proximate a lower portion 82 of the rotational seat frame 72. Additionally, a portion of the upper rotational bracket 42 can include a selective retaining mechanism 142 that operatively connects to a striker 144 that can be disposed on the upper seat-bracket receptacle 24 for use with the rotational seat frame assembly 46. Accordingly, the rotational seat frame assembly 46 can be installed upon the vehicle frame 12 and selectively rotated to a variety of positions about the pivot point 140 of the rotational seat frame 72. As discussed earlier, whether the rotational seat frame assembly 46 or the rotation-free seat frame assembly 44 are installed on the vehicle frame 12 of the vehicle 16, the configuration of the vehicle frame 12 at the upper and lower seat-bracket receptacles 24, 20 can be substantially identical or identical regardless of which of the rotation-free and rotational seat frame assemblies 44, 46 are installed during the manufacture of the vehicle 16.

Referring now to the embodiment illustrated in FIGS. 2-11, having described the configuration of various embodiments of the seat attachment system 10 for installing the rotational or rotation-free seat frame assemblies 46, 44, a method 500 is disclosed for installing a fixed rear seat 14 or a rotational rear seat 14 on the vehicle frame 12. This method 500 includes the step 502 of providing a vehicle frame 12 having a lower seat-bracket receptacle 20 and an upper seat-bracket receptacle 24. As discussed above, the upper and lower seat-bracket receptacles 24, 20 are configured to receive either of the rotational or rotation-free seat frame assemblies 46, 44. A seat frame 28 is also provided, where the seat frame 28 is configured to engage the lower seat-bracket receptacle 20 and the upper seat-bracket receptacle 24 (step 504). As discussed above, the seat frame 28 can be a portion of each of the rotational and rotation-free seat frame assemblies 46, 44, wherein the rotation-free seat frame assembly 44 has a specific rotation-free seat frame 70. Similarly, the rotational seat frame assembly 46 can include a separate and dedicated rotational seat frame 72 for use in this separate assembly.

According to the various embodiments, it is contemplated that a single seat frame design can be used in either the rotational or rotation-free seat frame assemblies 46, 44. In such an embodiment, it is contemplated that the pivot points 140 for use in the rotational seat frame assembly 46 can be attached to a base seat frame 28 such that the base seat frame 28 can be used in the rotational seat frame assembly 46 and also can include a fixed connection point 80 for attaching the seat frame 28 to the vehicle frame 12 as part of the rotation-free seat frame assembly 44.

Referring again to FIGS. 2-11, a rotation-free seat bracket set is provided, wherein the rotation-free seat bracket set includes a lower rotation-free bracket 30 and an upper rotation-free bracket 40 (step 506). Additionally, a rotational seat bracket set can be provided that includes the lower rotational bracket 32 and the upper rotational bracket 42 (step 508). Of the rotation-free and rotational seat bracket sets, only one can be selected for installation on the upper and lower seat-bracket receptacles 24, 20 (step 510). As discussed above, the upper and lower seat-bracket receptacles 24, 20 are configured to alternatively and exclusively receive either the rotational seat bracket set or the rotation-free seat bracket set. The selected seat bracket set is then prepared for installation onto the vehicle frame 12.

While the connection of the rotation-free seat bracket set and the rotational seat bracket set is described as being alternative and exclusive, it is contemplated that during the manufacture of the vehicle, if an error is made, in the installation of the rotational or rotation-free seat bracket set, such an error can, in certain circumstances, be corrected. By way of explanation, and not limitation, where the rotational and non-rotational seat bracket sets are connected to the vehicle frame 12 in a bolt-type connection, the rotational or non-rotational seat bracket sets can be removed and replaced to correct an error shortly after being installed. However, once installed, and assembly continues to a certain point thereafter, it is contemplated that the rotational and rotation-free seat frame assemblies 46, 44 are not substantially removable absent substantial damage or destruction of various components of the vehicle 16. Once selected, the selected seat bracket set, either the rotation-free seat bracket set or the rotational seat bracket set, is connected to the lower and upper seat-bracket receptacles 24, 20 (step 512). Once installed, the rotational seat bracket set is positioned to receive a rotational seat frame 72 of the rotational seat frame assembly 46. Alternatively, if the rotation-free seat bracket set is selected and installed upon the vehicle frame 12, the rotation-free seat bracket set is positioned to receive the rotation-free seat frame 70 in a non-rotational position 120 upon the vehicle frame 12. In this manner, the seat frame 28 is connected to the lower seat-bracket receptacle 20 and the upper seat-bracket receptacle 24 via the selected seat bracket set (either the rotational or rotation-free seat bracket sets) and installed upon the vehicle frame 12 at the lower and upper seat-bracket receptacles 20, 24. When the selected seat bracket set is the rotation-free seat bracket set, the seat frame 28 is fixedly connected to the lower rotation-free bracket 30 such that the seat frame 28 is not capable of rotational movement relative to the vehicle frame 12. Alternatively, when the selected seat bracket set is the rotational seat bracket set, the seat frame 28 is rotationally connected to the lower rotational bracket 32 such that the seat frame 28 is at least selectively rotatable relative to the vehicle frame 12 (step 514).

According to the various embodiments, it is contemplated that the use of the rotation-free seat frame assembly 44 can save significant costs, resources, materials and is generally more efficient than various conventional non-rotational seat assemblies that involve the use of a rotational pivot point 140 and a fixedly attached upper portion of a seat frame 28 to prevent rotation of the rear seat 14 after manufacture. Such systems that modify a conventional rotating seat frame assembly to be non-rotational, can include various latch systems that can incorporate substantially intricate mechanisms to permanently fix a lower portion 82 of the rotational seat frame 28 to the frame 12 of the vehicle 16.

Alternatively, the rotation-free seat frame assembly 44 described above can include an engagement protrusion 110 of the rotation-free seat frame 70 that can be in the form of a wire that is welded to the seat frame 28, where the wire engages the vertically-oriented slot 100 of the upper rotation-free bracket 40. In this manner, the welded wire that acts as the engagement protrusion 110 engages the vertically-oriented slot 100 to position the lower portion 82 of the rotation-free seat frame 70 such that the connection point 80 of the lower portion 82 of the rotation-free seat frame 70 can be bolted, welded, riveted, or otherwise permanently affixed to the bracket attachment portion 86 of the lower rotation-free bracket 30. In this manner, the upper rotation-free bracket 40 can serve as a positioning mechanism while the lower rotation-free bracket 30 serves as the primary attachment mechanism that connects the rotation-free seat frame 70 to the vehicle frame 12. This configuration can save significant costs and require the elimination of a substantial number of steps in manufacturing a vehicle 16 having a fixed rear seat 14. Accordingly, the process for manufacturing a fixed rear seat 14 is simplified without modifying the construction of the vehicle frame 12 to accommodate the rotational seat frame assembly 46 versus the rotation-free seat frame assembly 44. Additionally, as discussed above, the rotation-free seat frame assembly 44 discussed above utilizes less components than a conventional non-rotational seat assembly that is modified to not rotate relative to the vehicle frame 12 of the vehicle 16.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicular seat attachment system comprising:
   a lower bracket coupled to a base;
   an upper bracket having a vertically-oriented slot and coupled to a vehicle frame; and
   a seat frame affixed to the upper and lower brackets, the seat frame having an engagement protrusion that slidably engages the vertically-oriented slot to permanently define a rotation-free seat frame, the vertically-oriented slot being free of fasteners.

2. The vehicular seat attachment system of claim 1, wherein the seat frame includes a fixed connection point for attaching the seat frame to the lower bracket, wherein engagement between the engagement protrusion and the vertically-oriented slot defines a positioning mechanism of the seat frame, and wherein the seat frame is bolted to the lower bracket to define a primary attachment mechanism of the seat frame, wherein the vertically-oriented slot provides only lateral support for the seat frame.

3. The vehicular seat attachment system of claim 2, wherein the base defines a lower connection surface adapted to receive the lower bracket.

4. The vehicular seat attachment system of claim 1, wherein the upper bracket is attached to an upper connection surface defined within the vehicle frame.

5. The vehicular seat attachment system of claim 1, wherein a single-use retaining mechanism is disposed within the vertically-oriented slot, wherein the single-use retaining mechanism receives and permanently retains the engagement protrusion to define the rotation-free seat frame.

6. The vehicular seat attachment system of claim 1, further comprising:
   a lower frame-rotating bracket that is alternatively and exclusively coupled to a lower connection surface of the base, in lieu of the lower bracket;
   an upper frame-rotating bracket that is alternatively and exclusively coupled to an upper connection surface of the vehicle frame, in lieu of the upper bracket;
   a rotational seat frame having a pivot point that rotationally engages the lower frame-rotating bracket to define a rotating vehicle seat that is rotatable about the pivot point between a variety of rotational positions; and
   a striker disposed within the upper frame-rotating bracket that selectively engages an upper retaining mechanism of the rotational seat frame, wherein the upper retaining mechanism is selectively attached to the striker.

* * * * *